United States Patent [19]

Sullivan

[11] 4,429,928
[45] Feb. 7, 1984

[54] CLOTHES DRYING STRUCTURE

[76] Inventor: Ronald E. Sullivan, 9007 NE. 76th St., Vancouver, Wash. 98662

[21] Appl. No.: 295,737

[22] Filed: Aug. 24, 1981

[51] Int. Cl.³ .................... A47B 77/08; A01F 25/12
[52] U.S. Cl. ................................. 312/31; 312/31.02; 312/31.2; 312/236; 312/245; 34/151; 34/239
[58] Field of Search .............. 312/31, 31.01, 31.02, 312/31.03, 31.04, 31.05, 31.06, 31.1, 31.2, 31.3, 245, 236, 100; 34/239, 151

[56] References Cited

U.S. PATENT DOCUMENTS

| | | | |
|---|---|---|---|
| 1,452,066 | 4/1923 | Cave | 34/151 |
| 2,347,892 | 5/1944 | Derman | 312/31 |
| 2,815,585 | 12/1957 | Thompson | 34/151 |
| 2,975,529 | 3/1961 | Weber | 34/151 |
| 3,432,939 | 3/1969 | Eichholz | 34/151 |
| 3,577,650 | 5/1971 | Brahm | 34/151 |
| 3,866,336 | 2/1975 | Bereza | 34/239 |
| 3,905,125 | 9/1975 | Hubner | 34/151 |
| 3,975,833 | 8/1976 | Rothauser et al. | 34/151 |
| 3,986,649 | 10/1976 | Heimstra | 312/245 |
| 4,035,927 | 7/1977 | Spiegel | 34/151 |

Primary Examiner—Victor N. Sakran
Attorney, Agent, or Firm—James D. Givnan, Jr.

[57] ABSTRACT

A clothes drying structure attachable to the side of a motor home or the like and providing an enclosed area within which wearing apparel may be hung for drying by convective air currents. Heat from the motor home propane gas vent imparts convective movement to the drying air. Panels are suspended from a panel support the latter in turn supported alongside a wall of the living unit. For the sake of convenient stowage, the panels may be pliable and the support structure collapsible in a pivotal manner.

7 Claims, 4 Drawing Figures

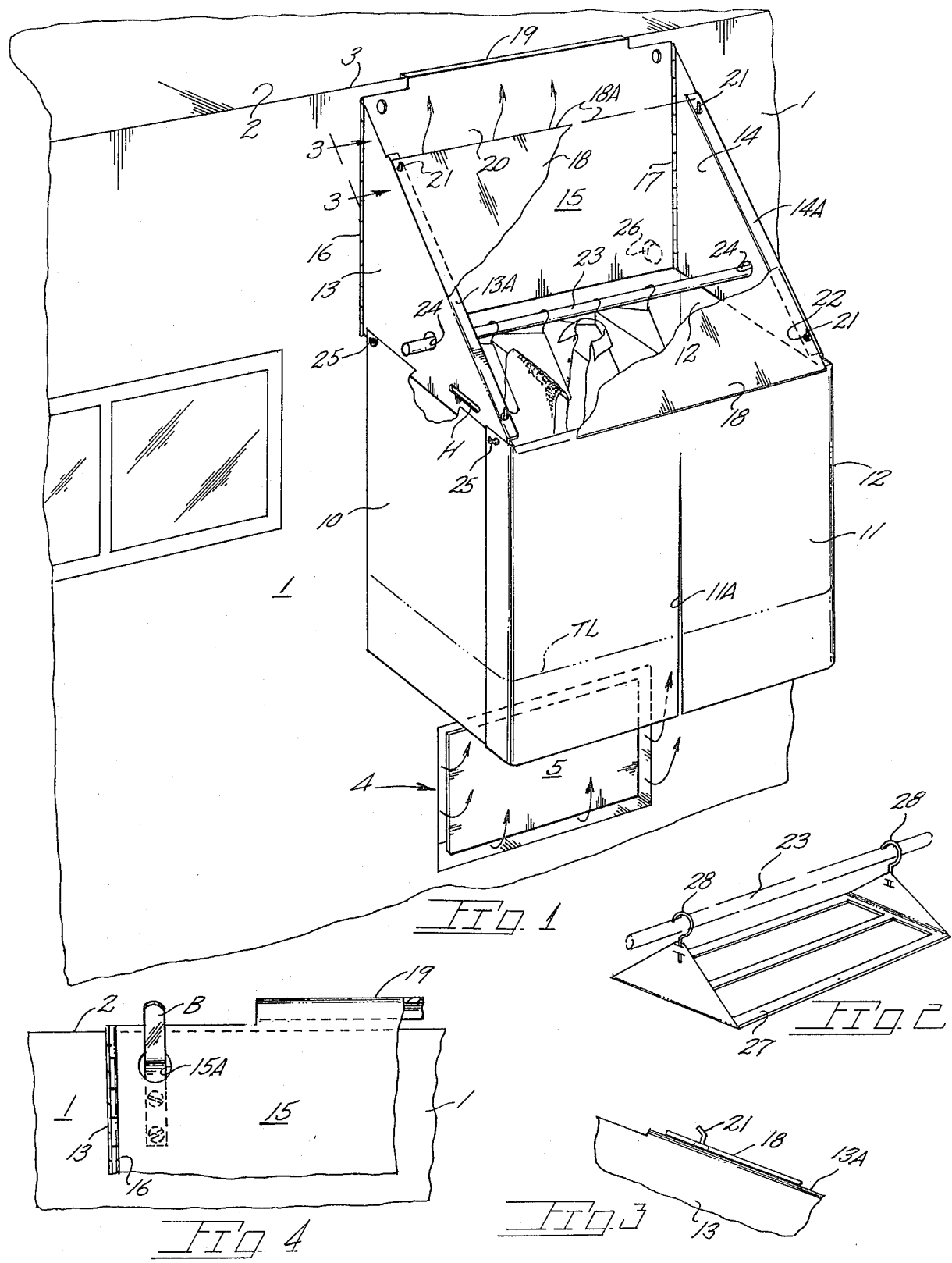

CLOTHES DRYING STRUCTURE

BACKGROUND OF THE INVENTION

The present invention concerns a structure locational on the side of a mobile living unit such as a motor home and within which structure various articles may be dried.

Mobile living units as presently understood, encompass a wide array of habitable mobile structures such as the above noted motor home, campers in place on pickup truck boxes and house trailers to mention the most common mobile units. Most all such living units utilize propane fueled applieances such as heaters, stoves and refrigerators. The products of propane combustion are virtually odor free and are normally vented through a wall of the living unit.

A problem encountered by those using mobile living units, especially for recreational purposes, is the absence of any appliance therein for the drying of damp clothes. Accordingly, wet clothes from adverse weather conditions must be dried within the living unit during inclement weather causing high humidity in same and hinder movement about the unit. Access to a clothes drier appliance is not always convenient especially for vacationers or hunters in remote areas.

SUMMARY OF THE PRESENT INVENTION

The present invention is embodied within a structure for a mobile living unit which supports clothing to be dried by the convective passage therethrough of exhaust gases from a living unit appliance along with ambient air.

The present structure is adapted for installation on a mobile living unit wall. An enclosure is thereby provided within which an array of articles may be placed for drying. A heated airflow passes by convection upwardly through the enclosure to dry the articles. The articles are protected during drying by the enclosure walls and by an enclosure upper wall. Access to the enclosure interior may be by a slit in the closure. For the sake of convenient storage within the living unit, the present structure may be collapsible.

Important objectives of the present invention include the provision of a clothes drying structure for temporary attachment to a mobile living unit above a heat vent of same whereby the vent discharge may pass through the clothes dryer enclosure for drying purposes; the provision of a clothes drying structure of low cost collapsible construction and one readily attachable to a wall of the living unit without modification or change to said wall; the provision of a clothes drying structure which utilizes heat otherwise dissipated to the atmosphere. These and other objectives will become subsequently apparent in the following description of the invention.

BRIEF DESCRIPTION OF THE DRAWING

In the accompaning drawing:

FIG. 1 is a perspective view of the present clothes drying structure temporarily supported in place on the side of a mobile living unit;

FIG. 2 is a perspective view of a drying rack which may be utilized with the present clothes drying structure;

FIG. 3 is a fragmentary side elevational view of the present structure taken along line 3—3 of FIG. 1; and FIG. 4 is a fragmentary elevational view of the base supported by optional brackets.

DETAILED DESCRIPTION OF THE PREFERRED EMBODIMENT

With continuing attention to the drawing wherein applied reference numerals indicate parts similarly hereinafter identified, the reference numeral 1 indicates an exterior wall of a mobile living unit such as a motor home, house trailer, truck mounted camper unit, etc., having a roof structure at 2. A gutter at 3 at the wall and roof intersection is commonly embodied within an upstanding flange extending along said intersection.

A vent structure is indicated generally at 4 in place within wall 1 of the living unit and serves to discharge the products of propane gas combustion to the atmosphere. Typically, such vents will have a baffle at 5 of rectangular or circular shape which deflects the combustion gases for release about the baffle perimeter. Normally, such gases are vented to the atmosphere with no utilization made of the heated exhaust flow. Most mobile living units utilize propane gas for cooking, heat and refrigeration appliances and which gas when burned is virtually odor free.

The present structure is intended for temporary securement to the mobile living unit against that portion of wall 1 located generally above heat vent 4. Upright panels at 10, 11 and 12 form an enclosure through which convective air currents containing burned propane gas may flow. The exterior surface of living unit wall 1 may serve to complete the enclosure or, if so desired, a fourth panel may be utilized lying in generally planar disposition to the unit wall 1. For purposes of access to the enclosure interior area, panel 11 may be provided with a slit 11A. Preferably, the panels are of pliable construction such as a fabric to permit convenient stowage and also lengthwise dimensioning of same as by trimming to avoid proximity to heat vent 4. Panels 10, 11 and 12 may otherwise be constructed from sheet metal in which case their proximity to heat vent 4 is of less concern. If desired, the panels may be shortened by cutting along a trim line TL.

Enclosure support means includes side members 13 and 14 which are jointly carried at opposite ends of a base 15. Preferably, side members 13 and 14 are swingably mounted as by hinges 16 and 17 to base 15 to permit collapsing of the side members for the sake of convenient stowage. Hooks at 25 on the side members removably carry the panels.

Base 15 is adapted for rested placement against wall 1 of the living unit by having a hook structure at 19 formed along its upper edge which structure overlies the vertical edge of gutter 3. Resilient spacers at 26 at each lower corner of the base prevent marring of wall 1. Accordingly, the panel support structure is held in place by gravity but may be otherwise adapted. Alternative mounting of the base may be by brackets at B in place on the living unit wall which may extend upwardly through openings 15A formed in base 15 for use in those instances where no gutter is provided on the mobile living unit as per FIG. 4.

In place on side members 13 and 14 is a top wall 18 which may be inclined in the manner of a roof to prevent rain water from entering the enclosure. An edge 18A of top wall 18 may be offset from base 15 to provide an open area 20 for the upward passage of convective air. The top wall is supported in place on side members 13 and 14 by means of projections as at 21 which extend through apertures 22 formed in said top wall. Projections 21 have inclined upper end portions to retain the top wall in place against random wind currents. Projections 21 are conveniently provided on flanges 13A and 14A of the side members. Top wall 18 additionally serves to lock the side members in perpendicular relationship to base 15 of the drying structure.

Hanger means at 23 is supported by side members 13 and 14 and preferably includes a clothes rod extending through openings at 24 therein. The clothes rod may define a kerf adjacent each of its ends to enable the rod to seat on those portions of the side member proximate openings 24.

In FIG. 2, a drying rack at 27 for footwear is shown which may be supported on the clothes rod. Said rack may be of sheet metal construction as shown with hanger hooks 28.

In use the drying structure is assembled from its folded or collapsed configuration with the top wall being set in place on the side member projections 21 to retain the structure in its expanded operative shape. After setting of the base member 15 into place against wall 1 of the unit, panels 10, 11 and 12 are suspended from hooks 25. Heat discharged from the living unit's appliances is exhausted out vent 4 whereupon an airflow is induced by convection upwardly through the enclosure to dry the wearing apparel hung thereon. The structure is removable simply by lifting same upwardly from gutter (or bracket) engagement subsequent to wearing apparel and panel removal. The structure is preferably of lightweight sheet metal construction but may be otherwise embodied within the spirit and scope of the present invention.

A handgrip as at H in each side member facilitates lifting of the present structure into place.

If so desired, base 15 could be permanently secured to the mobile unit wall structure.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A collapsible clothes drying structure for attachment to the exterior side of a mobile living unit having an exhaust vent in a wall of the unit, said structure comprising, an enclosure defining a clothes drying area, an enclosure support means for attachment to said living unit above the exhaust vent, said support means including a base for temporary rested abutment with the side of the mobile unit, side members, means movably mounting said side members on said base for collapsing movement of said side members about separate upright axes, a top wall in rested placement on said side members, and hanger means supported by said side members for supporting wearing apparel within the drying area of the enclosure.

2. The drying structure claimed in claim 1 wherein said enclosure is of a pliable nature.

3. The drying structure claimed in claim 2 wherein said enclosure is detachably mounted on said enclosure support means.

4. The drying structure claimed in claim 1 wherein said base is configured at its upper terminus in a hook structure for hooked engagement with the side of the living unit.

5. The drying structure claimed in claim 1 wherein said base defines apertures for rested engagement with brackets on said living unit.

6. The drying structure claimed in claim 1 wherein said side members of said enclosure support means detachably carry said hanger means.

7. The drying structure claimed in claim 1 wherein said base and said side members are of lightweight sheet metal construction, said mounting means being embodied in hinges permitting collapsing of said side members toward said base.

* * * * *